Sept. 18, 1956     R. D. RICHARDSON     2,763,151
DIFFERENTIAL OXYGEN ANALYZER

Filed Aug. 18, 1952     2 Sheets-Sheet 1

INVENTOR.
ROBERT D. RICHARDSON
BY Eugene C. Knoblock
ATTORNEY.

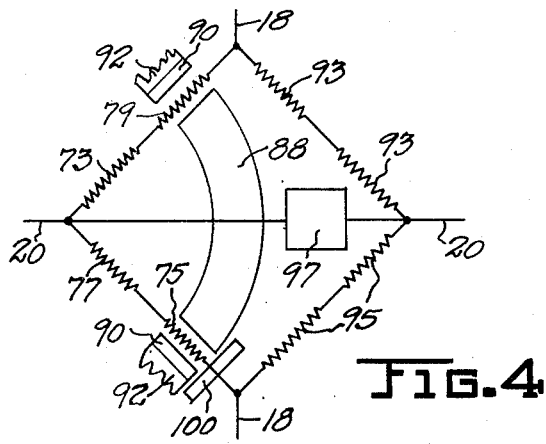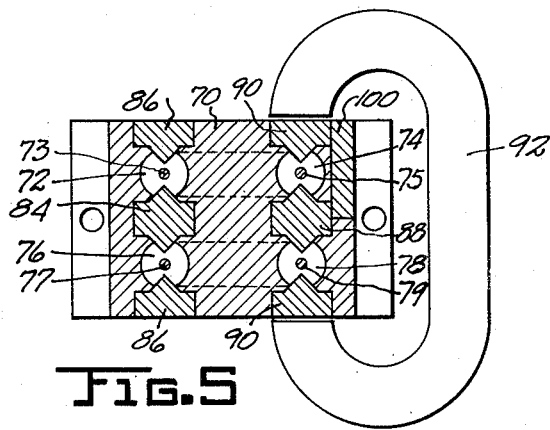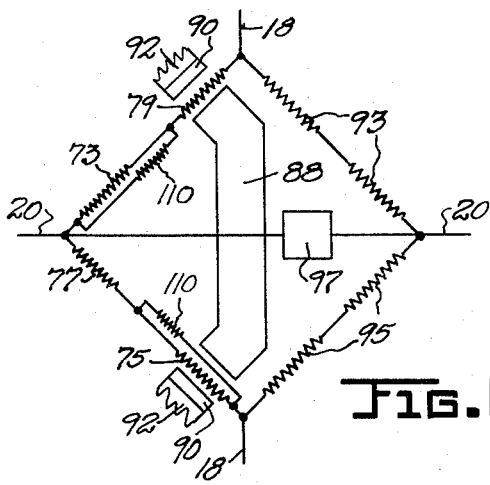

2,763,151

DIFFERENTIAL OXYGEN ANALYZER

Robert D. Richardson, Coolspring Township, La Porte County, Ind., assignor to The Hays Corporation, Michigan City, Ind., a corporation of Indiana Application August 18, 1952, Serial No. 305,014

7 Claims. (Cl. 73—27)

This invention relates to an oxygen analyzer, and more particularly to a differential oxygen analyzer. The instrument is of the magnetic type and constitutes an improvement upon the instruments disclosed in my co-pending patent applications, Serial No. 595,569, filed May 24, 1945, now Patent No. 2,658,384, and Serial No. 762,903, filed July 23, 1947, now Patent No. 2,658,385.

A magnetic oxygen analyzer of the type disclosed in my previous patent applications aforementioned uses a reference element or gas of zero magnetism. This makes the instrument very convenient for measurements in which the zero point of oxygen measurement is on scale. However, when small variations from a predetermined oxygen concentration must be measured, no advantage or increase in accuracy is gained by electrically or otherwise suppressing the zero point at a value close to the predetermined value. Electrical suppression of the zero point will result only in an increase in the readability of the instrument and an increase in its electrical sensitivity. The accuracy of the oxygen analyzer is not, however, controlled by the factors which cause errors of electrical measurement. Instead, accuracy of the instrument is controlled by the factors which cause errors in gas measurement, such as the factors of temperature, pressure, etc. Another important consideration is that errors in gas measurement usually vary in proportion to the reading, that is, are small at zero and greatest at 100% gas concentration.

An increase of the sensitivity of the instrument over a small range, for example, a range of from 95% to 100%, does not increase the accuracy of measurement. Instead, increase in sensitivity over a small range makes any error greater within the range. Thus any given error at 50% of full scale is measured as approximately half of the measurement of the same error at 100%. Consequently, if a small range is selected, such as a range of from 95% to 100%, any error in that range will be measured as a much larger part of the selected range than the same error would be measured if it occurred in the lower part of the full scale range.

An example of the condition above mentioned is given in the following illustration. An oxygen analyzer having a measuring range from zero to 25% measures air with an accuracy of plus or minus 2% air or plus or minus .42% oxygen, so that the percentage of oxygen in air as measured can vary by (21×.02). Since this is an error in measurement from the zero percentage of oxygen measured with reference to zero magnetism, the error is not improved by suppression of the scale. If, for example, the scale is to be suppressed to a range from 16% to 21% oxygen, the same error could be plus or minus .42% of oxygen or 8% of the scale range. The scale between zero and 25% is large enough to easily read the .42% error, and hence no improvement can be brought abount by suppressing zero, and, instead, a loss of utility will result.

It is the primary object of this invention to provide an oxygen analyzer which overcomes the aforementioned disadvantages by substantially removing, or at least greatly reducing, the rate of occurrence of error, so that regardless of the range of the total scale at which measurements are to be taken, the errors occurring will be no greater than those which would occur at the low end of the full zero to 100% scale.

A further object is to provide a device of this character which minimizes deviations or errors resulting from extraneous conditions, where such deflections or errors occur only in a limited part of the total scale, by effecting a reference setting at some point within the selected limited range to produce a condition equivalent to taking a measurement at the lower end of a full range scale.

A further object is to provide a device of this character and of the magnetic type, wherein a reference gas is contained in two chambers, one magnetized and the other non-magnetic, and a sample gas is likewise contained in two chambers, one of which is magnetic and the other non-magnetic.

A further object is to provide a device of this character by means of which measurements of oxygen purity can be made by using air as a reference gas.

A further object is to provide a device of the magnetic type wherein a reading in a measuring cell is reduced by a magnetic shunt, thereby enabling air or other gas to be used as a reference for an oxygen purity measurement.

A further object is to provide a device of the magnetic type having electrical shunt means for adjusting the electrical circuit to compensate for variations in temperature and voltage resistances of the instrument.

Other objects will be apparent from the following specification.

In the drawings:

Fig. 4 is a schematic view illustrating a modified embodiment of my invention, employing a magnetic shunt.

Fig. 5 is a sectional view of a modified embodiment of test cell, similar to Fig. 2 and illustrating the use of a magnetic shunt.

Fig. 6 is a schematic view illustrating another modified embodiment of my invention, employing an electrical shunt.

Figure 1:
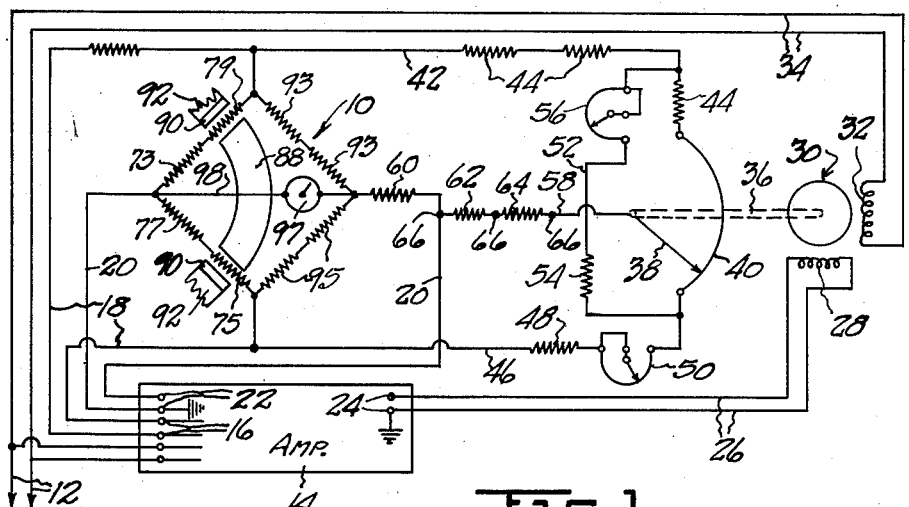
Fig. 1 is a schematic view of an electronic recorder utilizing my improved differential oxygen analyzer.
Figure 2:
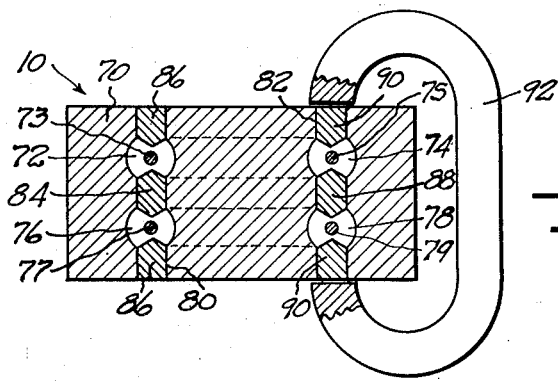
Fig. 2 is a sectional view of a gas measuring cell embodying my invention, taken on line 2—2 of Fig. 3.
Figure 3:
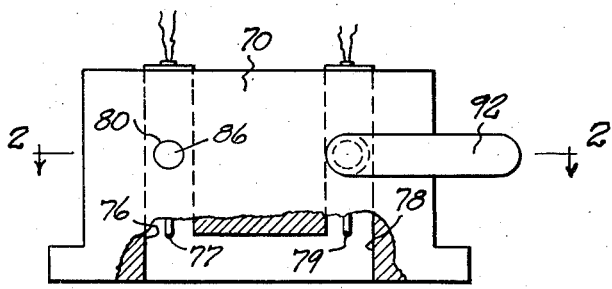
Fig. 3 is a side view of the measuring cell of my device.

Referring to the drawings, and particularly to the embodiment of the invention illustrated in Figs. 1 to 3, the numeral 10 designates one embodiment of my improved oxygen analyzer employed in conjunction with an electronic recorder circuit of the character illustrated in my co-pending application, Serial No. 724,047, filed January 24, 1947, now Patent No. 2,628,332.

The electronic recorder circuit will be described briefly and comprises electric lead lines 12 for supplying an amplifier 14. The bridge supply terminals 16 of the amplifier are connected by leads 18 with the input terminals of the Wheatstone bridge circuit. The output terminals of the Wheatstone bridge circuit are connected by leads 20 to the input terminals 22 of the amplifier 14. The output terminals 24 for the amplified signals from the Wheatstone bridge circuit 10 are connected by leads 26 with one winding 28 of an electric motor 30. The motor has a second winding 32 which is connected by leads 34 with the lines 12. The motor is preferably of the drag-cup type.

The motor has a driving connection 36 with the pen (not shown) of a recorder. The driving connection also actuates the sliding contactor 38 of a potentiometer including the slide wire 40. The slide wire 40 is connected by a lead 42 with one of the bridge input leads 18 and preferably has a plurality of resistors 44 interposed therein. The opposite end of the potentiometer slide wire 40 is connected by a lead 46 with the other bridge supply lead 18 and may have interposed therein one or more fixed resistors 48 and preferably a variable resistor or potentiometer 50 intended to serve as a zero adjusting means.

A lead or conductor 52 may connect the leads 42 and 46 and be arranged in parallel to the potentiometer slide wire 40. Such a lead preferably has one or more fixed resistors 54 therein and a variable resistor or potentiometer 56, which potentiometer 56 is preferably a trim calibrating or adjusting potentiometer.

A lead 58 preferably connects the slider 38 of the motor driven potentiometer with one of the leads 20 connected with the output terminal of the bridge 10. A plurality of resistors 60, 62 and 64 are interposed in the lead 58. These resistors may serve to compensate for various gas measurement conditions. Thus one may be a temperature compensating resistor, another may be a pressure compensating resistor, and another may be a calibrating resistor. The point of connection of the output lead 20 with the lead 58 may vary at any one of a plurality of connection points 66 located between the various resistors 60, 62 and 64.

The arrangement is such that any signal from the Wheatstone bridge circuit 10 of the gas analyzer is amplified by the amplifier 14 and transmitted thereby to the motor winding 28 to control the operation of the motor 30 which in turn drives the recording pen and the potentiometer slider 38 in a manner and direction tending to establish a rebalance of the bridge circuit. The circuit is essentially of the null balance type.

The gas analyzer includes a block 70 preferably of non-magnetic material; for example, the cell or block 70 may be formed from brass. The block has two connecting chambers 72 and 74 preferably extending parallel to each other, and a second pair of connected chambers 76 and 78 preferably of the same dimensions as the chambers 72 and 74. The chambers of the two sets are preferably arranged symmetrically with the chambers 72 and 76 being positioned alongside each other, and chambers 74 and 78 being positioned alongside each other. This arrangement of chambers is not essential, and two single chambers may be employed in place of two pairs of chambers.

The chambers 72—78 will preferably be of the type having an irregular cross-sectional shape characterized by a central restriction, as illustrated in Fig. 2. These restrictions may be formed in any manner found suitable, and, in the construction shown, are preferably formed by inserts mounted in the block 70. For this purpose the block 70 will have a transverse bore 80 formed therein and intersecting the chambers 72 and 76 to normally establish communication between said chambers. Similarly, the block 70 will be provided with a passage 82 intersecting and establishing communication with the chambers 74 and 78. An insert 84 is mounted in the center of the passage 80 between the chambers 72 and 76 and preferably will have pointed ends projecting in the overall outline of said chambers, as illustrated in Fig. 2. End inserts 86 are mounted in the opposite ends of the passage 80 and, at their inner ends, are configured, for example, V-shaped, similarly to the configuration of the ends of the central insert 84 with the configured portions projecting into the adjacent chamber of the two chambers 72 and 76. The passage 82 likewise has a central insert 88 and end inserts 90 mounted therein, the central inserts 88 being similar in shape and arrangement to the central insert 84, and the end inserts 90 being similar in arrangement to the central end inserts 86. All of the inserts 84, 86, 88 and 90 will preferably be formed of steel or other magnetic material, although only one set of inserts, for example, inserts 88 and 90, must be magnetic. The inserts will fit snugly in the passages and will plug the passages to prevent escape or leakage of gas through the passages. A permanent magnet 92, preferably of C-shape or U-shape as illustrated, has its poles juxtaposed to two similar end inserts, such as inserts 90, as illustrated in Fig. 2. The arrangement is such that said end inserts will be magnetic so that magnetic flux will pass through each of the chambers 74 and 78.

The chambers 72 and 74 are preferably connected by a line (not shown) to a source of the gas to be measured. The chambers 76 and 78 are adapted to contain a reference gas. If the reference gas is air, the chambers 76 and 78 may be open to atmosphere. However, the chambers may be sealed if that is desired.

The chamber 72 has an electrical resistance member 73, preferably elongated, positioned centrally therein at the restricted dimension portion of said chamber. The chamber 74 has resistance element 75, chamber 76 has resistance element 77, and chamber 78 has a resistance element 79. The elements 73, 75, 77, and 79 are preferably similar and electrically balanced. The heating elements 73, 75, 77, 79 are connected in the Wheatstone bridge circuit by suitable conductors, and the Wheatstone bridge circuit likewise will include other resistors 93 and 95, which resistors may be fixed resistors. The Wheatstone bridge circuit may also include a meter element 97 connected in a lead 98 extending across the output terminals of the bridge.

In Fig. 1 the magnetic insert 88 is shown schematically and the pole ends of the magnet 92 are shown only fragmentarily. It will be observed in Fig. 1 that the magnetically influenced heating element 79 for the reference gas is connected in one leg of the Wheatstone bridge circuit in series with the heating element 73. Similarly, the magnetically influenced heating element 75 for the sample gas is connected in another leg of the Wheatstone bridge in series with the heating element 77 for the reference gas. Such a connection is preferred for heat balancing purposes, but is not essential, and other arrangements may be made.

This construction and arrangement of oxygen analyzers permits a true zero to be set at up-scale oxygen concentration. In other words, it permits a reference balance to be made at a point on the scale other than zero. The reference chambers 76 and 78 will preferably contain a reference gas with a concentration of oxygen close to the value being measured. The other chambers 72 and 74 are supplied with the gas sample. As the oxygen content of the gas in the sample varies then, due to the paramagnetic properties of oxygen, an electrical variation occurs in the heating element 75. This variation is measured by the bridge circuit 10 and may be read at the meter or indicator 97 and may be recorded by a pin driven by the motor shaft 36 in the manner well understood in the art.

In order to set the zero point of the instrument after it has been connected in the electrical circuit illustrated, the same gas is placed in each of the chambers 72, 74, 76, 78 and the zero setting is made upon the scale according to the value of the reference gas. It will be noted that two readings are obtained on the opposite sides of the bridge. Consequently, the bridge will remain in balance for variations in temperature and pressure of the sample gas during normal operation. It is essential, of course, that the electrical filaments 73, 75, 77, 79 be properly chosen and adjusted to obtain this electrical symmetry.

Having thus conditioned the device for balance and zero adjustment, measurement is obtained and a reading is provided by passing the gas sample to be measured into the measuring pair of chambers 72 and 74. Inasmuch as the reference pair of chambers 76 and 78 will contain the reference gas used to make the zero setting, and whose content remains constant and is preferably of known oxygen concentration, any reading obtained upon the instrument is a reading of the deviation of the concentration of oxygen of the sample gas from the concentration of oxygen in the reference gas. Since the zero balance is set at the reading of the reference gas, the instrument shows the deviation from that reading, and, consequently, the instrument is a true suppressed zero. Any change in the thermal conductivity between the reference gas and the sample gas is canceled by the presence of some of the sample gas in the non-magnetized chamber 72. However, it is necessary that the gas around the paired reading and reference filaments have the same thermal conductivity, although it is not essential that the thermal conductivity of the gas around the reading pair be the same as that around the reference pair so that the thermal conductivity of the gas around the filaments of the reading pair may be different from the thermal conductivity of the gas around the filaments of the reference pair.

One example of the use to which this instrument may be put is to obtain a suppression of the scale to read in the range from 16% to 21%, in which case the zero error is set as it occurs at the 21% value. This range would be essentially a measurement of the variation of the oxygen of a sample from the normal oxygen concentration found in air. A gas sample would be passed through the reading or sample chambers 72 and 74 and air would be used in or passed through the reference chambers 76 and 78. The deflection of the instrument would show the difference of the concentration of oxygen in the sample and in air. A true suppressed zero range would exist in this example since the reference zero is at 21% (the concentration of oxygen in air being normally 20.9%.) Any deviation occurring will be limited to that which would occur at the lower part of normal full range scale, that is, between 0% and 5%. This is to be distinguished from a much higher deviation which would occur with previous types of magnetic instruments as explained above, because the suppressed range is substantially above zero.

When measuring the purity of oxygen, a sample of oxygen for reference would be difficult to obtain. With the present instrument oxygen purity may be measured, using air as a reference. In this instance an arrangement as illustrated in Figs. 4 and 5 would be employed in which a magnetic shunt is employed to reduce the reading in the measuring cell. In Figs. 4 and 5, parts similar to those illustrated in Figs. 1, 2 and 3 bear the same reference numerals used in Figs. 1, 2 and 3. The magnetic shunt is designated 100 in these two figures. As illustrated in Figs. 4 and 5, this shunt is mounted in the block 70 in a recess or cavity communicating with the passage 82 for a portion of its length. The shunt 100 constitutes a magnet metal block which is placed in contact with one of the end inserts 90 and with the center insert 88, so that it shunts the magnetic field existing within the chamber 74. The shunt 100 is preferably spaced from the chamber 74 so that it does not directly affect the magnetic flux in said chamber. In all other respects than the provision and arrangement of the shunt 100, the cell and the analyzer bridge circuit as illustrated in Figs. 4 and 5 is substantially the same as illustrated in Figs. 1, 2 and 3.

When a magnetically shunted cell as shown in Figs. 4 and 5 is employed in a Wheatstone bridge circuit as illustrated in Fig. 1, the electrical response secured when the sample gas is 100% oxygen may be the same as that secured when the reference cell contains air. Since the measuring of the reference cells responds in a like manner to external conditions, the air-conditioning cell compensates the readings for variations in these external conditions when the various electrodes are connected in the Wheatstone bridge circuit in the same manner as shown in Fig. 1. Since the compensation for or response to variations in external conditions may not be perfect, minor adjustments may be made in the temperature and voltage responses by electrically shunting the necessary filaments in a manner determined by trial and error until perfect compensation is secured. After these compensating adjustments are made, the readings of air in the reference chamber appear as readings for 100% oxygen for variations in temperature, pressure and other predictable variables. Therefore, the instrument has a true reference at 100% oxygen and can be suppressed for ranges of 95% to 100% oxygen with the low range of error previously explained as differentiated from the comparatively high range of error which would normally occur from previously known methods of suppressing the range of an instrument to the same percentages. It will be understood that this same principle can be used for any reference points between air and 100% oxygen. In other words, the magnetic shunt can be selected which will permit air to be used as a reference and accurate determinations of the concentration of oxygen to be made in a selected range or portion of the range between air and 100% oxygen.

Another arrangement in which the invention may be embodied, and in which parts similar to those shown in Figs. 1, 2 and 3, bear the same reference numerals as are used in Figs. 1, 2 and 3, is illustrated in Fig. 6. Electrical shunts 110 are employed in this instance in place of the magnetic shunt 100 used in Figs. 4 and 5. By proper compensation or adjustment of the shunts 110, substantially the same results can be secured as are secured with the device illustrated in Figs. 4 and 5 employing the magnetic shunt. As here illustrated, the electrical shunt will preferably be used with or associated with each of the electrical heating elements 73 and 75 which are subject to the influence of the sample gas.

One characteristic of the instruments embodying this invention is that the removal of the permanent magnet 92 from operative position with respect to the cell and the magnetic pole pieces 90 in each of the embodiments thereof is not effective as a basis for determining the zero reading of the instrument. Therefore, in order to check the calibration and zero reading of the instrument, it is necessary to introduce into the sample-containing part of the device a charge of gas of known oxygen content and then to observe the instrument reading to ascertain whether the reading corresponds to the known value. In cases where oxygen purity is involved, the instrument can be checked by connecting an oxygen generator to the cell to ascertain if the instrument will read 100% as it should if the generator output is oxygen of 100% purity.

While the preferred embodiments of the invention have been illustrated and described herein, it will be seen that changes in the device may be made within the scope of the appended claims without departing from the spirit of the invention.

I claim:

1. In an oxygen analyzer, a cell having a pair of chambers containing a reference gas and a pair of chambers for a gas to be analyzed, the chambers of each pair being connected and substantially similar, an electrical heating element in each chamber, said heating elements being substantially balanced electrically, means for creating a magnetic field in one chamber of each pair, and electrical measuring means for measuring variations in the resistances of said heating elements including a Wheatstone bridge circuit having a plurality of legs and containing all heating elements, the magnetically influenced heating elements being located in adjacent legs of said circuit, and one of the heating elements of the other pair being connected in series and in the same leg of said circuit with each magnetically influenced element.

2. In an oxygen analyzer, a cell having a pair of chambers containing a reference gas and a pair of chambers for a gas to be analyzed, the chambers of each pair being connected and substantially similar, an electrical heating element in each chamber, said heating elements being substantially balanced electrically, means for creating a magnetic field in one chamber of each pair, and electrical measuring means for measuring variations in the resistances of said heating elements including a Wheatstone bridge circuit having a plurality of legs and containing all heating elements, the magnetically influenced heating elements being located in adjacent legs of said circuit, each magnetized heating element of one pair being connected in one leg of said circuit in series with the heating element of the non-magnetized chamber of the other pair.

3. In an oxygen analyzer, a cell having a pair of chambers containing a reference gas and a pair of chambers for a gas to be analyzed, the chambers of each pair being connected and substantially similar, an electrical heating element in each chamber, said heating elements being substantially balanced electrically, means for creating a magnetic field in one chamber of each pair, and electrical measuring means for measuring variations in the resistances of said heating elements including a Wheatstone bridge circuit having a plurality of legs, the magnetically influenced heating elements being located in adjacent legs of said circuit, and a magnetic shunt member carried by said cell to reduce the magnetic field in one magnetized chamber compared to the magnetic field in the other magnetized chamber.

4. In an oxygen analyzer, a cell having a pair of chambers containing a reference gas and a pair of chambers for a gas to be analyzed, the chambers of each pair being connected and substantially similar, an electrical heating element in each chamber, said heating elements being substantially balanced electrically, means for creating a magnetic field in one chamber of each pair, said magnetic fields being substantially equal and electrical measuring means for measuring variations in the resistances of said heating elements including a Wheatstone bridge circuit having a plurality of legs, the magnetically influenced heating elements being located in adjacent legs of said circuit, and a shunt connected in said bridge circuit in parallel to one of said magnetically influenced elements.

5. In an oxygen analyzer cell, a non-magnetic cell body having four similar spaced chambers, two of said chambers communicating with each other and containing a reference gas and the other two chambers containing a sample gas and communicating with each other, an electrical resistance element in each chamber, said elements being substantially balanced electrically, and means including a magnet having a pair of poles for creating a magnetic field in one of said reference gas chambers and in one of said sample gas chambers, said cell body having magnetizable parts defining parts of said magnet-field-containing chambers and aligned with each other and interposed between said magnet poles.

6. In an oxygen analyzer cell, a non-magnetic body having four similar spaced chambers and walls outlining said chambers, two of said chambers communicating with each other and containing a reference gas and the other two chambers containing a sample gas and communicating with each other, an electrical resistance element in each chamber, said elements being substantially balanced electrically, and means for creating a magnetic field in one of said reference gas chambers and in one of said sample gas chambers, said cell body having openings communicating with said last named chambers, and magnetic inserts seated in said openings, and each forming a part of said chamber wall.

7. In an oxygen analyzer cell, a non-magnetic cell body having four similar spaced chambers each defined by a wall, two of said chambers communicating with each other and containing a reference gas and the other two chambers containing a sample gas and communicating with each other, an electrical resistance element in each chamber, said elements being substantially balanced electrically, and means for creating a magnetic field in one of said reference gas chambers and in one of said sample gas chambers, said cell body having a passage therethrough intersecting both of said last named chambers, a magnetic insert seated in and sealing the portion of said passage between said chambers and magnetic inserts seated in and sealing the opposite ends of said passage, said inserts each forming a part of said chamber wall.

References Cited in the file of this patent

UNITED STATES PATENTS

| 2,603,964 | Foley et al. | July 22, 1952 |

FOREIGN PATENTS

| 712,762 | Germany | Oct. 24, 1941 |
| 724,041 | Germany | Aug. 17, 1942 |